(12) United States Patent
Nakajima et al.

(10) Patent No.: US 10,985,670 B2
(45) Date of Patent: Apr. 20, 2021

(54) POWER SUPPLY DEVICE HAVING CHARGING CURRENT DETECTION, INVERTER DEVICE AND CONVERTER DEVICE USING THE POWER SUPPLY DEVICE, AND REFRIGERATION DEVICE AND AIR CLEANER USING THE INVERTER DEVICE OR THE CONVERTOR DEVICE

(71) Applicant: DAIKIN INDUSTRIES, LTD., Osaka (JP)

(72) Inventors: Yuuki Nakajima, Osaka (JP); Junya Mitsui, Osaka (JP); Toshiaki Satou, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 41 days.

(21) Appl. No.: 16/022,270

(22) Filed: Jun. 28, 2018

(65) Prior Publication Data

US 2018/0309382 A1    Oct. 25, 2018

Related U.S. Application Data

(63) Continuation of application No. PCT/JP2016/088396, filed on Dec. 22, 2016.

(30) Foreign Application Priority Data

Dec. 28, 2015    (JP) .............................. JP2015-257014

(51) Int. Cl.
*H02M 7/48*    (2007.01)
*F24F 1/20*    (2011.01)
(Continued)

(52) U.S. Cl.
CPC ................ *H02M 7/48* (2013.01); *F24F 1/20* (2013.01); *F24F 11/30* (2018.01); *H02J 3/12* (2013.01);
(Continued)

(58) Field of Classification Search
CPC ............ H02M 3/28; H02M 7/04; H02M 7/12; H02M 2001/0009; H02M 2001/4283
See application file for complete search history.

(56) References Cited

U.S. PATENT DOCUMENTS 3,631,332 A * 12/1971 Williamson ............ H02M 5/45
363/49
4,350,949 A *  9/1982 Fujita ........................ G05F 1/44
323/237
(Continued)

FOREIGN PATENT DOCUMENTS

CN         102662104 A      9/2012
EP         2 816 289 A1    12/2014
(Continued)

OTHER PUBLICATIONS

International Search Report for PCT/JP2016/088396 (PCT/ISA/210) dated Mar. 14, 2017.
(Continued)

*Primary Examiner* — Yusef A Ahmed
(74) *Attorney, Agent, or Firm* — Birch, Stewart, Kolasch & Birch, LLP

(57) ABSTRACT

A power supply device is provided with a diode rectifier circuit having an input connected to an AC power source, the output of the diode rectifier circuit producing a rectified voltage; a capacitor connected to the diode rectifier to be charged by the rectified voltage; and a controller configured to receive as input a detection signal representing a charging current flowing into the capacitor, the controller being further configured to calculate a voltage frequency, a cycle, or a power voltage phase of the AC power on the basis of the detection signal. At least one of the following is used to detect the charging current flowing into the capacitor and produce the detection signal: a photocoupler; an amplifier (Continued)

circuit including a shunt resistor and an operational amplifier; and a current transformer.

12 Claims, 4 Drawing Sheets

(51) Int. Cl.
    *H02M 3/28*     (2006.01)
    *H02M 7/04*     (2006.01)
    *H02M 1/08*     (2006.01)
    *H02J 3/12*     (2006.01)
    *F24F 11/30*     (2018.01)
    *H02M 7/12*     (2006.01)
    *H02P 6/08*     (2016.01)
    *H02P 27/06*     (2006.01)

(52) U.S. Cl.
    CPC ............. *H02M 1/081* (2013.01); *H02M 3/28* (2013.01); *H02M 7/04* (2013.01); *H02M 7/12* (2013.01); *H02P 6/08* (2013.01); *H02P 27/06* (2013.01)

(56) References Cited

U.S. PATENT DOCUMENTS

| | | | | |
|---|---|---|---|---|
| 4,908,756 | A * | 3/1990 | Higashino | H02M 7/5387 363/58 |
| 5,179,842 | A * | 1/1993 | Kanazawa | F25B 49/025 318/778 |
| 5,200,644 | A * | 4/1993 | Kobayashi | F25B 49/025 307/103 |
| 5,793,623 | A * | 8/1998 | Kawashima | H02M 1/4225 363/36 |
| 6,101,108 | A * | 8/2000 | Wittenbreder, Jr. | H02M 1/4225 323/222 |
| 6,181,583 | B1 * | 1/2001 | Okui | H02M 1/4208 363/45 |
| 8,937,450 | B2 * | 1/2015 | Higashiyama | H02P 27/06 318/799 |
| 8,988,021 | B2 * | 3/2015 | Clothier | H02P 6/181 318/400.01 |
| 9,590,615 | B1 * | 3/2017 | Hayakawa | H02M 3/33507 |
| 10,461,658 | B2 * | 10/2019 | Adragna | H02M 1/4225 |
| 2005/0213355 | A1 * | 9/2005 | Koike | H02M 1/10 363/21.16 |
| 2009/0168470 | A1 * | 7/2009 | Chen | H02H 7/122 363/55 |
| 2009/0190382 | A1 * | 7/2009 | Usui | H02M 1/4225 363/89 |
| 2009/0289557 | A1 * | 11/2009 | Itoh | H05B 41/2882 315/127 |
| 2010/0053999 | A1 * | 3/2010 | Jang | H02M 1/08 363/21.01 |
| 2010/0165668 | A1 * | 7/2010 | Lin | H02M 1/10 363/21.02 |
| 2010/0182808 | A1 * | 7/2010 | Sato | H02M 3/33592 363/21.18 |
| 2011/0101898 | A1 * | 5/2011 | Shinomoto | H02M 1/4233 318/400.3 |
| 2012/0075889 | A1 * | 3/2012 | Sasaki | H02M 1/4225 363/21.09 |
| 2013/0128633 | A1 * | 5/2013 | Ichihara | H02M 3/156 363/37 |
| 2013/0257301 | A1 * | 10/2013 | Tran | H02M 3/33569 315/200 R |
| 2013/0293258 | A1 * | 11/2013 | Lechat | H02M 1/32 324/764.01 |
| 2014/0028354 | A1 | 1/2014 | Yao et al. | |
| 2014/0092642 | A1 * | 4/2014 | Yoshinaga | H05B 45/37 363/21.12 |
| 2014/0117964 | A1 * | 5/2014 | Walters | H05B 45/38 323/299 |
| 2014/0268951 | A1 * | 9/2014 | Wang | H02M 1/32 363/78 |
| 2015/0015212 | A1 * | 1/2015 | Kadoya | B23K 11/26 320/137 |
| 2016/0156281 | A1 * | 6/2016 | Arisawa | H01F 27/323 62/228.1 |
| 2016/0380571 | A1 * | 12/2016 | Yoshida | H02H 7/1216 318/504 |
| 2017/0310208 | A1 * | 10/2017 | Bae | H02H 9/001 |
| 2017/0373630 | A1 * | 12/2017 | Figie | H02P 29/0241 |
| 2018/0287488 | A1 * | 10/2018 | Chan | H02M 1/4208 |
| 2018/0287490 | A1 * | 10/2018 | Yuasa | H02M 1/4216 |
| 2019/0006934 | A1 * | 1/2019 | Nakashima | H03K 17/162 |
| 2019/0081553 | A1 * | 3/2019 | Sugimoto | H02M 1/4225 |
| 2020/0021231 | A1 * | 1/2020 | Yamakawa | H02P 29/024 |
| 2020/0044457 | A1 * | 2/2020 | Miyake | H02M 7/062 |

FOREIGN PATENT DOCUMENTS

| | | |
|---|---|---|
| JP | 2001-238452 A | 8/2001 |
| JP | 2002-223599 A | 8/2002 |
| JP | 2005-20837 A | 1/2005 |
| JP | 2005-257238 A | 9/2005 |
| JP | 2006-34070 A | 2/2006 |
| JP | 2012-137914 A1 | 7/2012 |
| JP | 2012-151966 A | 8/2012 |

OTHER PUBLICATIONS

Extended European Search Report dated Apr. 11, 2019 in corresponding European Application No. 16881695.7.

* cited by examiner

POWER SUPPLY DEVICE HAVING CHARGING CURRENT DETECTION, INVERTER DEVICE AND CONVERTER DEVICE USING THE POWER SUPPLY DEVICE, AND REFRIGERATION DEVICE AND AIR CLEANER USING THE INVERTER DEVICE OR THE CONVERTOR DEVICE

CROSS REFERENCE TO RELATED APPLICATIONS

This application is a Continuation of PCT International Application No. PCT/JP2016/088396, filed on Dec. 22, 2016, which claims priority under 35 U.S.C. 119(a) to Patent Application No. 2015-257014, filed in Japan on Dec. 28, 2015, all of which are hereby expressly incorporated by reference into the present application.

TECHNICAL FIELD

The present invention relates to a power supply device and devices using the power supply device.

BACKGROUND ART

In a machine such as an air conditioner that controls movement while communicating with an indoor unit and an outdoor unit, traditionally the power for a transmission circuit between the indoor unit and the outdoor unit is generated from an AC power supply, as described in Patent Literature 1 (Japanese Patent Application Laid-open No. 2005-257238).

In addition to the air conditioner, in some cases, some machines require control synchronized with a power cycle. For instance, a detection circuit for detecting a phase angle of an AC voltage, which is a power phase, the timing of a zero cross at which the positive and the negative of the AC voltage are reversed, a power frequency of the AC voltage, or a power cycle of the AC voltage, is required in an inverter that drives a motor, such as the inverters described in Patent Literature 2 (Japanese Patent Application Laid-open No. 2005-20837), Patent Literature 4 (Japanese Patent Application Laid-open No. 2002-223599), and Patent Literature 5 (Japanese Patent Application Laid-open No. 2006-34070), and in a rectifier circuit such as the one described in Patent Literature 3 (Japanese Patent Application Laid-open No. 2001-238452).

SUMMARY

Technical Problem

When mounting both the transmission power circuit such as the one described in Patent Literature 1 and the detection circuit such as the one illustrated in Patent Literature 3, these circuits are normally provided independently and realized by the same method of half-wave rectification, but in actuality a current limiting resistor and a rectifier diode are installed for the two circuits, resulting in increasing the number of parts and the mounting area on a control board.

An object of the present invention is to provide a power supply device capable of realizing reduction of the number of parts and the mounting area on the control board.

Solution to Problem

A power supply device according to a first aspect of the present invention has: a power generation unit; a detection unit; and a calculation unit. The power generation unit has a charging unit that rectifies AC power and is charged by a rectified voltage. The detection unit detects a charging current flowing to the charging unit. The calculation unit calculates a voltage frequency, a cycle, or a power voltage phase of the AC power on the basis of a detection signal of the detection unit.

A conventional detection circuit for detecting a voltage frequency, a cycle, or a power voltage phase of AC power is usually provided independently and therefore needs to be provided with a rectifying part.

This power supply device, however, can be provided with a detection circuit that can also uses a rectifying part that is already provided in the power generation unit. Therefore, the number of parts and the mounting area on a control board equipped with this power supply device can be reduced. Note that detection of the timing of a zero cross can also mean detection of a specific power voltage phase (electrical angle of 0 degrees, 180 degrees) and is therefore taken into consideration in detection of a power voltage phase.

A power supply device according to a second aspect of the present invention is the power supply device according to the first aspect, wherein the power generation unit is a transmission power circuit that supplies power to a transmission circuit transmitting a signal through a transmission line, the power generation unit dividing a rectified voltage and thereby generating a voltage lower than the rectified voltage.

According to this power supply device, because the charging unit is charged to the voltage being lower than the rectified voltage, the voltage rating of a component of the detection unit can be set to be lower than a power voltage equivalent value on the basis of the voltage being lower than the rectified voltage, resulting in reducing the cost of a control board equipped with this power supply device.

A power supply device according to a third aspect of the present invention is the power supply device according to the first aspect, wherein the power generation unit is a DC load power circuit that supplies power to a DC load, the power generation unit supplying rectified power to the DC load.

A power supply device according to a fourth aspect of the present invention is the power supply device according to the first aspect, wherein the power generation unit is a power circuit on the primary side of a switching power circuit, the power generation unit supplying rectified power to the primary side of the switching power circuit.

A power supply device according to a fifth aspect of the present invention is the power supply device according to any one of the aspects 1 to 4, wherein the power generation unit further has a current limiting resistor that limits a current flowing to the charging unit, and a rectifier diode that is connected in series with the current limiting resistor.

In a case where, for example, this power supply device has a circuit that detects a power cycle on the basis of whether a current is flowing to the charging unit or not, the timing at which the current flows only needs to be detected by a photocoupler. In this case, the existing current limiting resistor and rectifier diode can be used, thereby reducing the number of parts.

An inverter device according to a sixth aspect of the present invention is an inverter device that has a control unit and the power supply device according to any one of the first to fifth aspects, and the control unit controls an amplitude or a frequency of an AC output voltage on the basis of the voltage frequency, the cycle, or the power voltage phase (including the timing of a zero cross).

By being equipped with the power supply device that has the detection unit for detecting the charging current flowing to the charging unit, the inverter device that uses, for example, the power frequency to perform control no longer needs to be provided with an independent detection circuit, thereby realizing reduction of the number of parts and the mounting area.

A converter device according to a seventh aspect of the present invention is a converter device that has a control unit and the power supply device according to any one of the first to fifth aspects and generates DC power from the AC power, and the control unit controls a DC output voltage or an AC current on the basis of the voltage frequency, the cycle, or the power voltage phase (including the timing of a zero cross).

By being equipped with the power supply device that has the detection unit for detecting the charging current flowing to the charging unit, the converter device that uses, for example, the power voltage phase to perform control no longer needs to be provided with an independent detection circuit, thereby realizing reduction of the number of parts and the mounting area.

A refrigeration device according to an eighth aspect of the present invention is a refrigeration device having the inverter device according to the sixth aspect.

An air cleaner according to a ninth aspect of the present invention is an air cleaner having the inverter device according to the sixth aspect.

A refrigeration device according to a tenth aspect of the present invention is a refrigeration device having the converter device according to the seventh aspect.

An air cleaner according to an eleventh aspect of the present invention is an air cleaner having the converter device according to the seventh aspect.

A refrigeration device according to a twelfth aspect of the present invention is the refrigeration device according to the eighth aspect or the tenth aspect, further having a utilization-side unit and a heat source-side unit. The heat source-side unit is connected to the utilization-side unit by electrical wiring including a transmission line for transmitting a signal, and AC power is supplied to the utilization-side unit and the heat source-side unit. The power supply device is used as a power supply device of a transmission circuit between the utilization-side unit and the heat source-side unit.

Since this refrigeration device can generate a primary-side signal of the detection unit (i.e., the charging current) by using the existing capacitor, current limiting resistor and diode of the power supply device of the transmission circuit between the utilization-side unit and the heat source-side unit, the number of parts and the mounting area on a control board equipped with this power supply device can be reduced.

Advantageous Effects of Invention

Because the power supply device according to the first aspect of the present invention can be provided with a detection circuit that also uses a rectifying part provided in the power generation unit, the number of parts and the mounting area on a control board equipped with this power supply device can be reduced.

In the power supply device according to the second aspect of the present invention, the charging unit is charged to a voltage being lower than a rectified voltage. Therefore, the voltage rating of a component of the detection unit can be set to be lower than a power voltage equivalent value on the basis of the voltage being lower than a rectified voltage, resulting in reducing the cost of a control board equipped with this power supply device.

The power supply devices according to the third and fourth aspects of the present invention can achieve the same actions and effects as the power supply device according to the first aspect.

In a case where, for example, the power supply device according to the fifth aspect of the present invention has a circuit that detects a power cycle on the basis of whether a current is flowing to the charging unit or not, only the timing at which the current flows needs to be detected by a photocoupler. In this case, the existing current limiting resistor and rectifier diode can be used, thereby reducing the number of parts.

In a case where the inverter device according to the sixth aspect of the present invention uses, for example, the power frequency to perform control, by being equipped with the power supply device that has the detection unit for detecting the charging current flowing to the charging unit, the inverter device no longer needs to be provided with an independent detection circuit, thereby realizing reduction of the number of parts and the mounting area.

In a case where the converter device according to the seventh aspect of the present invention uses, for example, the power voltage phase to perform control, by being equipped the power supply device that has the detection unit for detecting the charging current flowing to the charging unit, the converter device no longer needs to be provided with an independent detection circuit, thereby realizing reduction of the number of parts and the mounting area.

The refrigeration device according to the eighth aspect of the present invention can achieve the same actions and effects as the inverter device according to the sixth aspect.

The air cleaner according to the ninth aspect of the present invention can achieve the same actions and effects as the inverter device according to the sixth aspect.

The refrigeration device according to the tenth aspect of the present invention can achieve the same actions and effects as the converter device according to the seventh aspect.

The air cleaner according to the eleventh aspect of the present invention can achieve the same actions and effects as the converter device according to the seventh aspect.

In the refrigeration device according to the twelfth aspect of the present invention, the primary signal (i.e., the charging current) of the detection unit can be generated using the existing capacitor, current limiting resistor, and diode of the power circuit for the transmission circuit provided between the utilization-side unit and the heat source-side unit. Therefore, the number of parts and the mounting area on a control board equipped with this power supply device can be reduced.

DESCRIPTION OF EMBODIMENTS

Embodiments of the present invention are described hereinafter with reference to the drawings. The embodiments below represent the specific examples of the present invention and are not intended to limit the technical scope of the present invention.

First Embodiment (1) Overall Configuration of Air Conditioner 1

Figure 1:
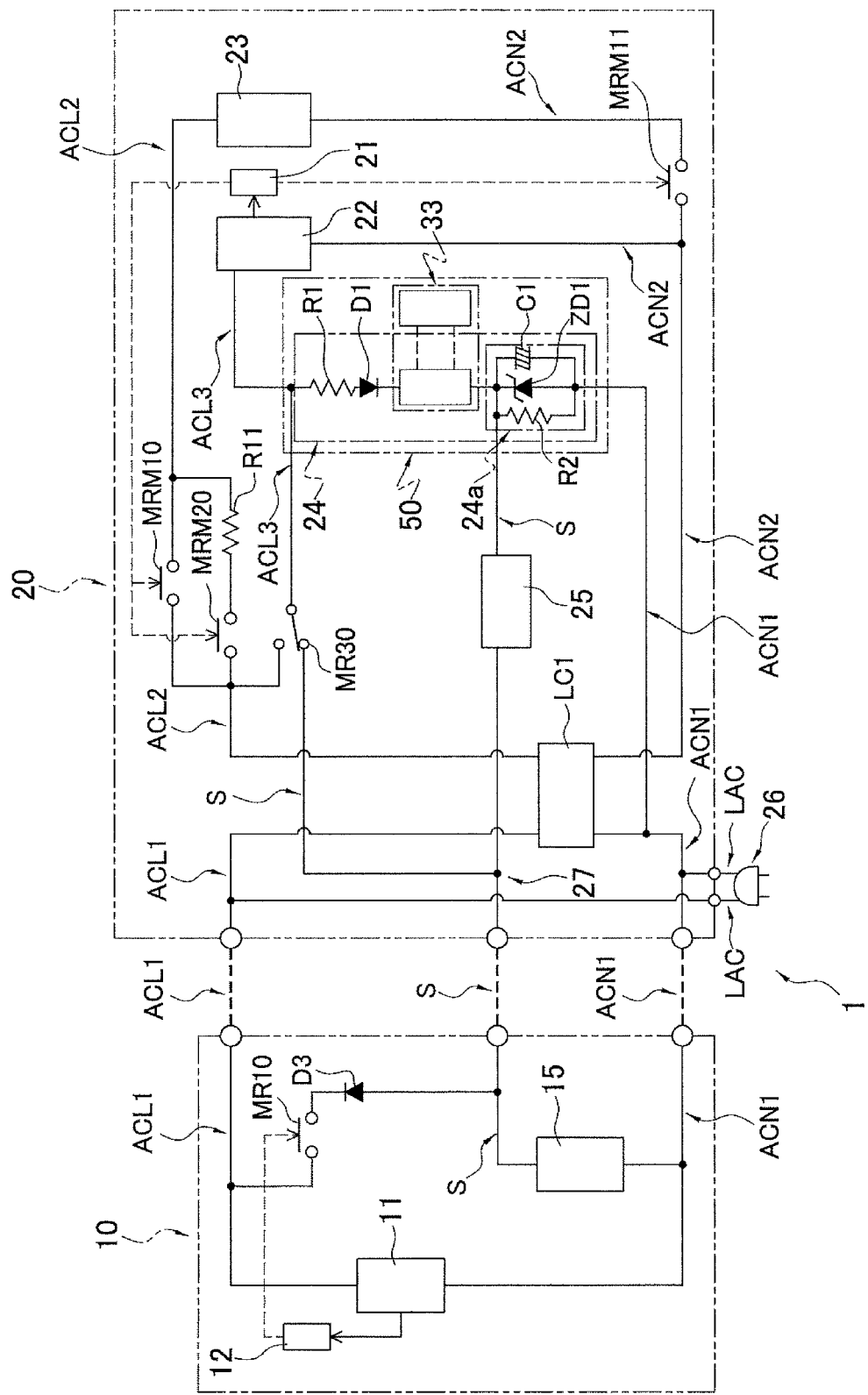
FIG. 1 is a configuration diagram of an air conditioner having a power supply device according to a first embodiment of the present invention.

FIG. 1 is a configuration diagram of an air conditioner 1 having a power supply device 50 according to a first embodiment of the present invention. As shown in FIG. 1, the air conditioner 1 has an indoor unit 10, an outdoor unit 20, a signal line S, a high voltage-side first power line ACL1, and a reference-side first power line ACN1.

The signal line S is provided for the purpose of communicating a transmission signal between the indoor unit 10 and the outdoor unit 20. The high voltage-side first power line ACL1 and the reference-side first power line ACN1 are connected to the indoor unit 10 and the outdoor unit 20, and supply the indoor unit 10 and the outdoor unit 20 with power received from the outside through the outdoor unit 20.

Note that the description below mainly describes the minimum operations of the air conditioner in operation, and the operations performed when power is applied or during standby (including when recovered from the standby mode) are the same as those described in Patent Literature 1; thus, the detailed descriptions thereof are omitted herein.

(2) Outdoor Unit 20

The outdoor unit 20 has a main power supply unit 26, a main power supply line LAC, the signal line S, the high voltage-side first power line ACL1, a high voltage-side second power line ACL2, a high voltage-side third power line ACL3, the reference-side first power line ACN1, a reference-side second power line ACN2, a reference-side third power line ACN3, the power supply device 50, a starting power supply unit 22, an outdoor drive power supply unit 23, an outdoor microcomputer 21, a make contact MRM10, a make contact MRM20, a make contact MRM11, a transfer contact MR30, an EMI filter LC1, and an outdoor transmission/reception unit 25.

(2-1) Main Power Supply Unit 26

The main power supply unit 26 receives power supply from the outside (e.g., a commercial power supply) and supplies main power through the main power supply line LAC, the high voltage-side first power line ACL1, and the reference-side first power line ACN1.

(2-2) Outdoor Drive Power Supply Unit 23

The outdoor drive power supply unit 23 receives supply of the main power through the main power supply line LAC, the high voltage-side first power line ACL1, the reference-side first power line ACN1, the EMI filter LC1, the high voltage-side second power line ACL2, and the reference-side second power line ACN2.

The outdoor drive power supply unit 23 generates outdoor drive power and supplies the outdoor drive power through the high voltage-side second power line ACL2 and the reference-side second power line ACN2. The outdoor drive power described here is power for driving outdoor machines (e.g., a motor, a compressor, an actuator, etc.). Specifically, the outdoor machines may be the inverters (polyphase current supply circuits) described in Patent Literature 2, Patent Literature 4, and Patent Literature 5 or may include the converter circuit (power circuit) described in Patent Literature 3.

(2-3) EMI Filter LC1

The EMI filter LC1 is connected to the high voltage-side first power line ACL1, the reference-side first power line ACN1, the high voltage-side second power line ACL2, and the reference-side second power line ACN2, and reduces a first noise.

The first noise described here is generated by the outdoor drive power supply unit 23 and the outdoor machines. With this EMI filter LC1, the noise transmitted from the high voltage-side second power line ACL2 and the reference-side second power line ACN2 to the high voltage-side first power line ACL1 and the reference-side first power line ACN1 is reduced.

(2-4) Power Supply Device 50

The power supply device 50, in an operating state thereof, receives supply of the main power through the main power supply line LAC, the high voltage-side first power line ACL1, the reference-side first power line ACN1, the EMI filter LC1, the high voltage-side second power line ACL2, the transfer contact MR30, and the high voltage-side third power line ACL3, to generate transmission power, and supplies the transmission power through the signal line S. The transmission power described here is DC power for transmitting/receiving a transmission signal to/from the indoor unit 10 through the signal line S.

(2-5) Outdoor Microcomputer 21

The outdoor microcomputer 21 controls the outdoor machines and the make contacts provided in the outdoor unit 20. The outdoor microcomputer 21, based on the activation thereof, cancels the blocking caused by the make contact MRM10, the make contact MRM20, and the make contact MRM11.

(2-6) Starting Power Supply Unit 22

The starting power supply unit 22, in an operating state thereof, receives supply of the main power through the main power supply line LAC, the high voltage-side first power line ACL1, the reference-side first power line ACN1, the EMI filter LC1, the high voltage-side second power line ACL2, the reference-side second power line ACN2, and the high voltage-side third power line ACL3.

The starting power supply unit 22 generates starting power for activating the outdoor microcomputer 21 from a standby state thereof, and supplies the starting power to the outdoor microcomputer 21. Specifically, upon switching from the standby state to the operating state, the starting power supply unit 22 receives supply of the main power through the high voltage-side first power line ACL1, an MR10 provided in the indoor unit 10, which is described hereinafter, the signal line S, the transfer contact MR30, the high voltage-side third power line ACL3, the reference-side second power line ACN2, the EMI filter LC1, and the reference-side first power line ACN1. In this manner, the starting power supply unit 22 supplies the starting power to the outdoor microcomputer 21, to activate the outdoor microcomputer 21.

(2-7) Transfer Contact MR30

The transfer contact MR30 is disposed between the signal line S/high voltage-side second power line ACL2 and the high voltage-side third power line ACL3. The transfer contact MR30, in a standby state thereof, is connected to the signal line S, and blocks supply of the main power from the main power supply unit 26 to the starting power supply unit 22.

After being switched from its standby state to operating state, the transfer contact MR 30 is disconnected from the signal line S and connected to the high voltage-side second power line ACL2, and cancels the blocking of the supply of the main power from the main power supply unit 26 to the power supply device 50.

(2-8) Make Contact MRM10, Make Contact MRM20, Make Contact MRM11

The make contact MRM10 and the make contact MRM20 are provided on the high voltage-side second power line ACL2, and the make contact MRM11 is disposed on the reference-side second power line ACN2.

The make contact MRM10, the make contact MRM20, and the make contact MRM11, in standby states thereof, block the supply of the main power from the main power supply unit 26 to the outdoor drive power supply unit 23.

The outdoor microcomputer 21, based on the activation thereof, cancels the blocking caused by the make contact MRM10, the make contact MRM20, and the make contact MRM11.

(2-9) Outdoor Transmission/Reception Unit 25

The outdoor transmission/reception unit 25, in an operating state thereof, receives a signal that is transmitted from the indoor unit 10 through the signal line S. In its operating state, on the other hand, the outdoor transmission/reception unit 25 also transmits a signal to the indoor unit 10 through the signal line S.

(3) Indoor Unit 10

The indoor unit 10 has a command power supply unit 11, the signal line S, the high voltage-side first power line ACL1, the reference-side first power line ACN1, an indoor microcomputer 12, the make contact MR10, and an indoor transmission/reception unit 15.

(3-1) Command Power Supply Unit 11

The command power supply unit 11 receives supply of the main power from the main power supply unit 26 through the main power supply line LAC, the high voltage-side first power line ACL1, and the reference-side first power line ACN1.

The command power supply unit 11 generates command power and supplies the command power to the indoor microcomputer 12. The command power described here is power for receiving a command from the outside, such as a command from a remote controller.

(3-2) Indoor Transmission/Reception Unit 15

The indoor transmission/reception unit 15, in an operating state thereof, receives a signal that is transmitted from the outdoor unit 20 through the signal line S. In its operating state, on the other hand, the indoor transmission/reception unit 15 also transmits a signal to the outdoor unit 20 through the signal line S.

(3-3) Indoor Microcomputer 12

The indoor microcomputer 12 not only controls indoor machines such as an actuator and a sensor, but also controls the make contact MR10. The indoor microcomputer 12 also receives a command from the outside, such as a command from a remote controller.

(3-4) Make Contact MR10

The make contact MR10 is disposed between the high voltage-side first power line ACL1 and the signal line.

Upon reception of a command from the outside in the standby state, the make contact MR10 is caused to enter a connected state by the indoor microcomputer 12, and is connected to the outdoor unit through the signal line, supplying power to the outdoor unit. Once the transmission power is generated by the power supply device 50 of the outdoor unit, the make contact MR10 is disconnected by the indoor microcomputer 12.

(4) Configuration of Power Supply Device 50

The power supply device 50 is configured by a transmission power supply unit 24, a power cycle detection circuit 33, and a part of the outdoor microcomputer 21.

(4-1) Detailed Configuration of Transmission Power Supply Unit 24

Figure 2:
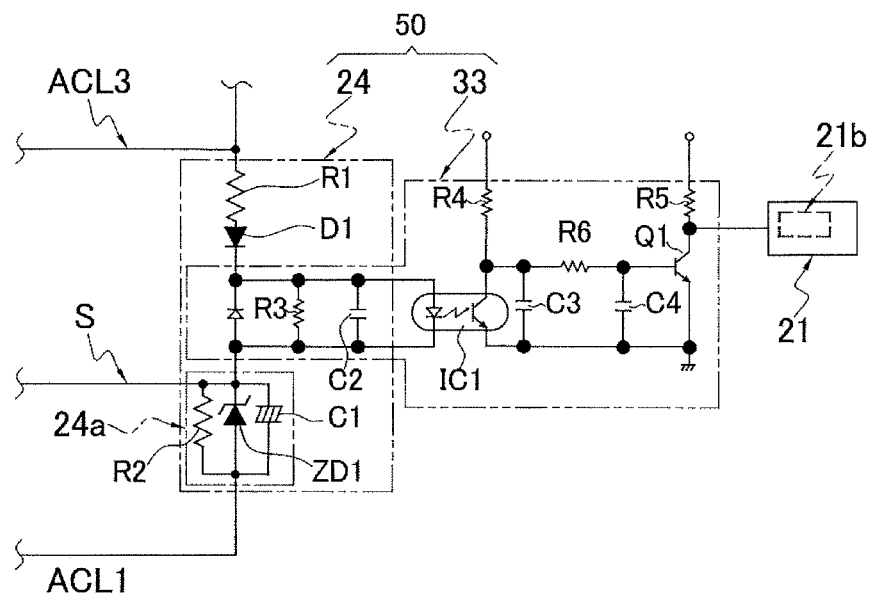
FIG. 2 is a circuit block diagram of the power supply device.

FIG. 2 is a circuit block diagram showing the transmission power supply unit 24 and the power cycle detection circuit 33. The transmission power supply unit 24 has at least a rectifying element D1, a constant voltage element ZD1, and a smoothing capacitor C1.

The main power that is supplied through the high voltage-side first power line ACL1, the reference-side first power line ACN1, the EMI filter LC1, the high voltage-side second power line ACL2, the reference-side second power line ACN2, the transfer contact MR30, and the high voltage-side third power line ACL 3 as described above, is converted from AC power to DC power at the rectifying element D1 to charge the smoothing capacitor C1.

The transmission power supply unit 24 further has a current limiting resistor R1 for limiting a current that flows in when the smoothing capacitor C1 is being charged. The current limiting resistor R1 is connected in series with the rectifying element D1.

The DC power rectified by the rectifying element D1 is smoothed by the smoothing capacitor C1 in a charging unit 24$a$. The constant voltage element ZD1 and a resistor R2 are connected in parallel with the smoothing capacitor C1, and the DC power, rectified and smoothed, is regulated by the constant voltage element ZD1 so as not to become equal to or greater than a constant value. The charging unit 24$a$ is charged when the voltage of the high voltage-side first power line ACL1 is higher than the voltages of the reference-side first power line ACN1 and the smoothing capacitor C1 (i.e., breakdown voltage of the constant voltage element ZD1). The regulated DC power is supplied to the outdoor transmission/reception unit 25 and the indoor transmission/reception unit 15 through the signal line S as the transmission power.

The reference side of the transmission power supply unit 24 bypasses the EMI filter LC1, to be connected to the reference-side first power line ACN1.

(4-2) Detailed Configuration of Power Cycle Detection Circuit 33

The power cycle detection circuit 33 shown in FIG. 2 detects a current that flows into the capacitor C1 and the constant voltage element ZD1 of the charging unit 24$a$ (referred to as "charging current" hereinafter). The power cycle detection circuit 33 has a photocoupler IC1.

At the time of charging, when the charging current of the capacitor C1 is input to a primary-side light emitting diode of the IC1, in a case the value of the input current is equal to or greater than a predetermined threshold, the primary-side light emitting diode emits light, which is received by a secondary-side phototransistor of the photocoupler IC1, establishing conduction between a collector and an emitter of the phototransistor. A resistor R3 is connected to the primary-side light emitting diode of the photocoupler IC1 so as to be in parallel with a capacitor C2, and the voltage between both ends of the resistor R3 is clamped to a forward voltage (Vf) of the IC1. At the time of charging, an applied AC voltage is divided by the charging unit 24$a$ (the parallel circuit with the capacitor C1, the constant voltage element ZD1, and the resistor R2), the detection circuit 33, the current limiting resistor R1, and the rectifying element D1. Because the voltage between the both ends of the detection circuit 33 is low as described above even when the rectifying element D1 is on, in actuality most of the voltage is divided by the charging unit 24a and the current limiting resistor R1. In other words, because the power cycle detection circuit 33 is driven by a voltage lower than the voltage rectified by the rectifying element D1, the rating of a component of the detection circuit 33 can be set low on the basis of the voltage of the component.

Figure 3:
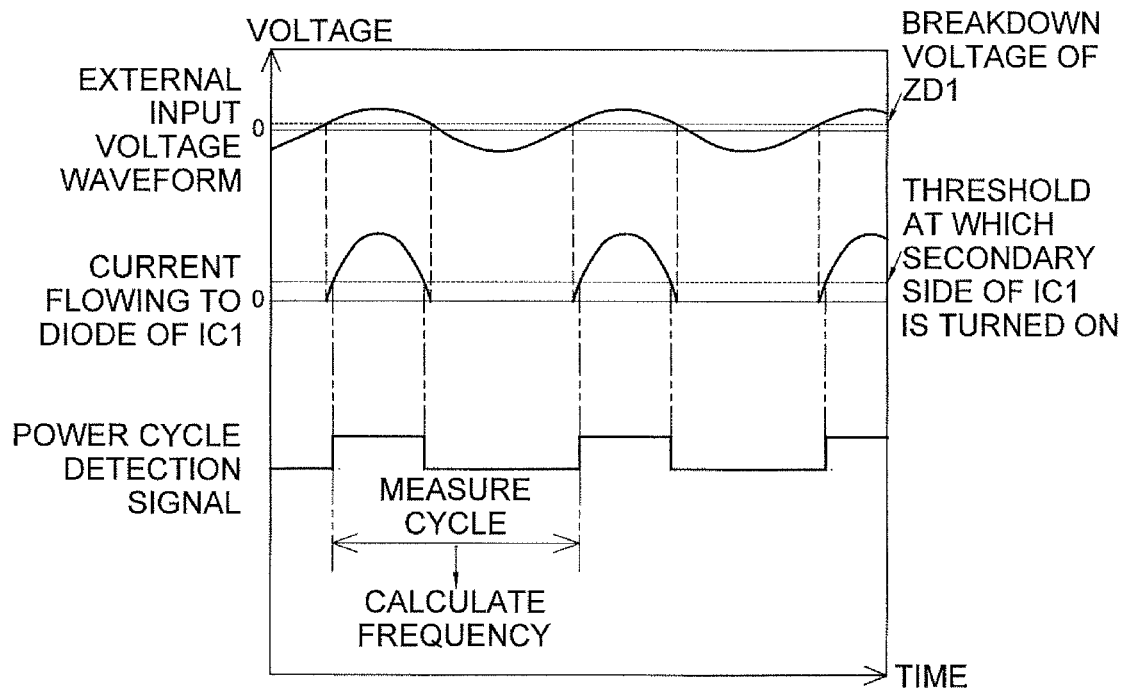
FIG. 3 is a graph showing an external input voltage waveform and a power cycle detection signal waveform.

FIG. 3 is a graph showing an external input voltage waveform and a power cycle detection signal waveform. In FIG. 3, the horizontal axis represents time and the vertical axis represents voltages. The input current (i.e., the charging current) of the primary-side light emitting diode of the IC1 changes according to power cycles, wherein the inter-collector-emitter of the secondary phototransistor of the IC1 is turned on when the input current of the primary-side light emitting diode of the IC1 becomes equal to or greater than a threshold. Therefore, each cycle in which the primary-side light emitting diode emits light and the inter-collector-emitter of the phototransistor is turned on, matches a power cycle. Note that in this example a transistor Q1 is arranged as shown in FIG. 2, so that an output of the power cycle detection circuit (an input of the outdoor microcomputer) is a High signal when the phototransistor is on.

(4-3) Outdoor Microcomputer 21

The outdoor microcomputer 21 has a calculation unit 21b for calculating the power cycles. As described above, since the photocoupler IC1 is repeatedly turned on/off per power cycle, the outdoor microcomputer 21 acquires each obtained on/off signal and causes the calculation unit 21b to calculate a power cycle.

Based on a detection signal of the power cycle detection circuit 33, the calculation unit 21b calculates a cycle of the AC power by measuring the signal cycle of the detection signal; the calculation unit 21b can also calculate a voltage frequency or power voltage phase of the AC power. For example, the voltage frequency can be obtained by calculating the reciprocal of a power cycle. Furthermore, the power voltage phase can be estimated by figuring what part in an electrical angle (power phase) the rising timing or the falling timing of a power cycle detection signal corresponds to, and counting the time elapsed since the timing. Also, the timing of a zero cross at which the positive and the negative of a power voltage are reversed can be calculated in the same way because the calculation is achieved by obtaining a specific power voltage phase (0 degrees, 180 degrees).

(5) Characteristics of First Embodiment (5-1)

Since the power supply device 50 can be provided with the power cycle detection circuit 33 that also uses the rectifying element D1 or the current limiting resistor R1 which is already provided in the transmission power supply unit 24, the number of parts and the mounting area on a control board equipped with the power supply device 50 can be reduced.

(5-2)

In the power supply device 50, the charging unit 24a is charged to a voltage being lower than a voltage rectified by the rectifying element D1, and the rating of a component of the power cycle detection circuit 33 using the charging unit 24a can be set low on the basis of the voltage being lower than the voltage rectified by the rectifying element D1. Thus, cost reduction can be achieved in a control board equipped with the power supply device 50.

(6) Other

The first embodiment describes the power supply device 50 that supplies power to the transmission circuit for transmitting/receiving a transmission signal to/from the indoor unit 10 and the outdoor unit 20 of the air conditioner; however, the application of the present invention is not limited to the air conditioner. The present invention is useful as a power supply device for other refrigeration devices such as a power supply device that supplies power to a transmission circuit for transmitting/receiving a transmission signal to/from a utilization-side unit and a heat source-side unit of a heat pump water heater.

Moreover, the cycle/voltage frequency/power voltage phase/zero-cross timing of the AC power that are calculated by the outdoor microcomputer can be used in the inverter devices (polyphase current supply circuits) disclosed in Patent Literature 2, Patent Literature 4, and Patent Literature 5 or the converter circuit (power circuit) disclosed in Patent Literature 3.

Second Embodiment

A second embodiment describes an inverter device as an example of a DC load device equipped with the power supply device according to the present invention. The inverter device is used as, for example, a device for controlling the rotational speed of a fan motor of the air conditioner to a target rotational speed. In addition, an inverter device of a compressor motor sharing the same power supply is connected to the power supply device.

(1) Inverter Device 100

Figure 4:
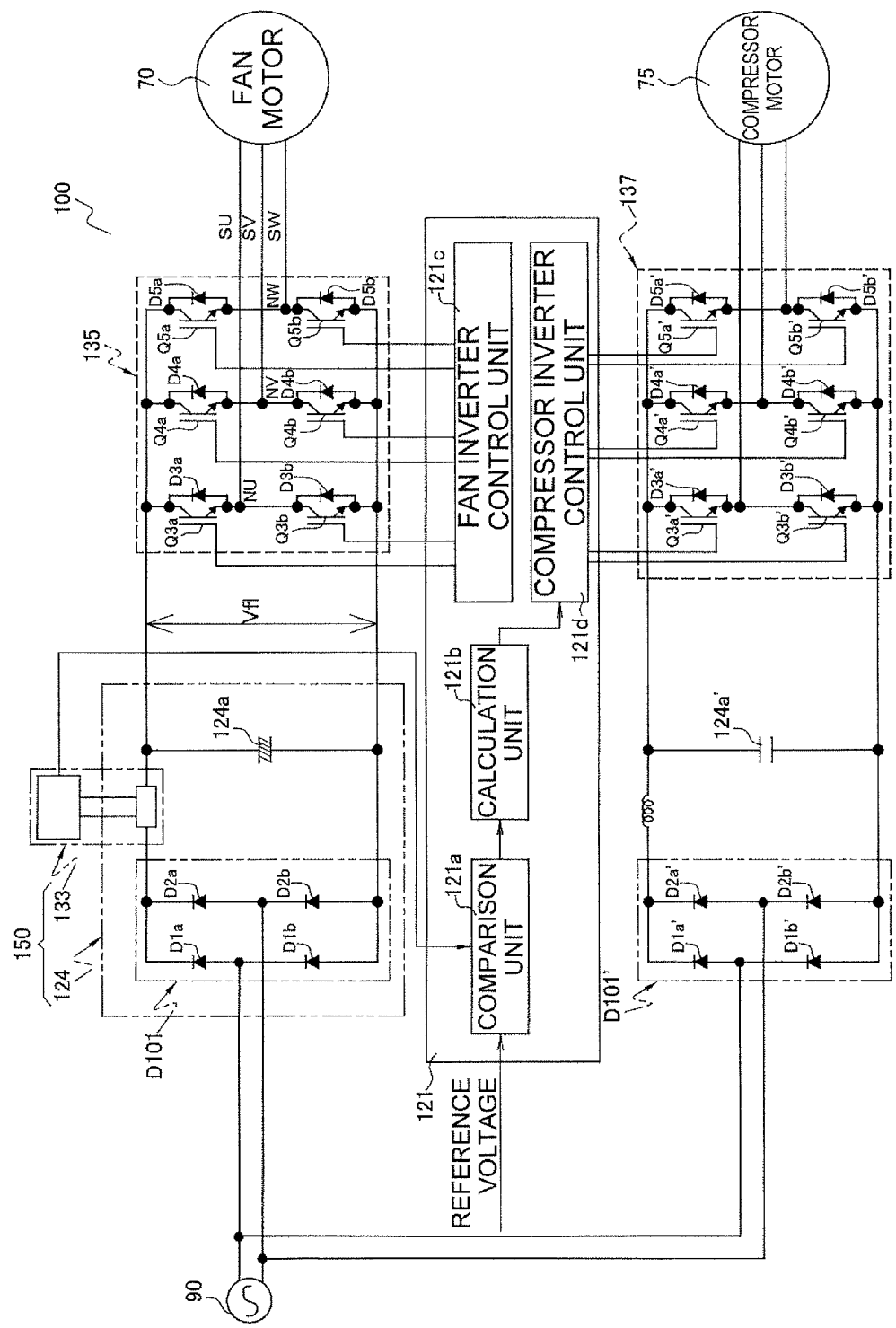
FIG. 4 is a circuit block diagram of an inverter device equipped with a power supply device according to a second embodiment of the present invention.

FIG. 4 is a circuit block diagram of an inverter device 100 equipped with a power supply device 150 of the second embodiment of the present invention. As shown in FIG. 4, the inverter device 100 has the power supply device 150, a fan motor inverter unit 135, a compressor motor inverter unit 137, and a control unit 121.

(1-1) Power Supply Device 150

The power supply device 150 is configured by a power circuit 124 for a fan motor inverter main circuit, a current detection unit 133, and a part of the control unit 121.

(1-1-1) Power Circuit 124 for Inverter Main Circuit

The power circuit 124 for the fan motor inverter main circuit includes a rectifying unit D101 and a smoothing capacitor 124a. The power circuit 124 for the fan motor inverter main circuit generates DC power from AC power.

(1-1-1-1) Rectifying Unit D101

The rectifying unit D101 is configured into a bridge by four diodes D1a, D1b, D2a, D2b. Specifically, the diodes D1a and D1b are connected in series to each other, as well as the diodes D2a and D2b. Each of cathode terminals of the diodes D1a, D2a is connected to a positive-side terminal of the smoothing capacitor 124a and functions as a positive-side output terminal of the rectifying unit D101. Each of anode terminals of the diodes D1b, D2b is connected to a negative-side terminal of the smoothing capacitor 124a and functions as a negative-side output terminal of the rectifying unit D101.

The junction point between the diode D1a and the diode D1b is connected to one of the poles of a commercial power supply 90. The junction point between the diode D2a and the diode D2b is connected to the other pole of the commercial power supply 90. The rectifying unit D101 rectifies an AC voltage that is output from the commercial power supply 90, thereby charging the smoothing capacitor 124a.

(1-1-1-2) Smoothing Capacitor 124a

The smoothing capacitor 124a has one end connected to the positive-side output terminal of the rectifying unit D101 and the other end to the negative-side output terminal of the rectifying unit D101. The smoothing capacitor 124a smoothes a voltage rectified by the rectifying unit D101. For convenience of explanation, the voltage smoothed by the smoothing capacitor 124a is referred to as "smoothed voltage Vf1" hereinafter.

The smoothed voltage Vf1 is applied to the fan motor inverter unit 135 that is connected to the output side of the smoothing capacitor 124a.

(1-1-2) Current Detection Unit 133

The current detection unit 133, located between the rectifying unit D101 and the smoothing capacitor 124a, is connected to the positive-side output terminal of the smoothing capacitor 124a. The current detection unit 133 detects a charging current flowing into the smoothing capacitor 124a.

The current detection unit 133 may employ the same configuration as that of the power cycle detection circuit 33 described in the first embodiment; however, the configuration of the current detection unit 133 is not limited thereto. For example, the current detection circuit 133 may be configured by an amplifier circuit that uses a shunt resistor and an operational amplifier for amplifying the voltage between both ends of the resistor, or a direct current-current transformer (DCCT). The charging current detected by the current detection unit 133 is input to a comparison unit 121a of the control unit 121.

(1-2) Fan Motor Inverter Unit 135 and Compression Motor Inverter Unit 137

The fan motor inverter unit 135 is connected to the output side of the smoothing capacitor 124a. In FIG. 1, the fan motor inverter unit 135 includes a plurality of insulated-gate bipolar transistors (simply referred to as "transistors" hereinafter) Q3a, Q3b, Q4a, Q4b, Q5a, Q5b, and a plurality of reflux diodes D3a, D3b, D4a, D4b, D5a, D5b.

The transistors Q3a and Q3b, the transistors Q4a and Q4b, and the transistors Q5a and Q5b are mutually connected in series, and the diodes D3a to D5b are connected to the transistors Q3a to Q5b in parallel in such a manner that collector terminals and emitter terminals of the transistors are respectively connected to cathode terminals and anode terminals of the diodes.

The basic configuration of the compressor motor inverter unit 137 is the same as that of the fan motor inverter unit 135; thus, the same reference numerals as those of the components of the fan motor inverter unit 135 that are attached with a mark "'" (e.g., Q3a' etc.) are used and the detailed descriptions are omitted accordingly.

(1-3) Control Unit 121

The control unit 121 has the comparison unit 121a, a calculation unit 121b, a fan motor inverter control unit 121c, and a compressor motor inverter control unit 121d.

The comparison unit 121a compares a detected voltage output by the current detection unit 133 with a reference voltage, and outputs a signal only when the detected voltage is higher than the reference voltage.

The calculation unit 121b calculates a frequency from the signal cycle output by the comparison unit 121a. This frequency is a power frequency. The calculation unit 121b also calculates an AC power voltage phase from a signal output by the comparison unit 121a.

The comparison unit 121a and the calculation unit 121b configure a part of the power supply device 150.

The compressor motor inverter control unit 121d drives the compressor motor inverter unit 137 by using the method described in, for example, Patent Literature 5, on the basis of the power frequency and the power voltage phase that are output by the calculation unit 121b. The detailed description of the operation of the fan motor inverter control unit 121c is not necessary in this embodiment and is therefore omitted, but the fan motor inverter control unit 121c causes the fan motor inverter unit 135 to generate drive voltages SU, SV, SW for driving a motor 70, as each of the transistors Q3a to Q5b is turned on and off at appropriate timing.

(2) Operations

The AC voltage supplied by the commercial power supply 90 is full-wave rectified by the rectifying unit D101 and then smoothed by the smoothing capacitor 124a. The smoothed voltage Vf1 is applied to the fan motor inverter unit 135 connected to the output side of the smoothing capacitor 124a. The current detection unit 133 detects the charging current that flows into the smoothing capacitor 124a. The control unit 121 acquires the detection value output by the current detection unit 133.

Figure 5:
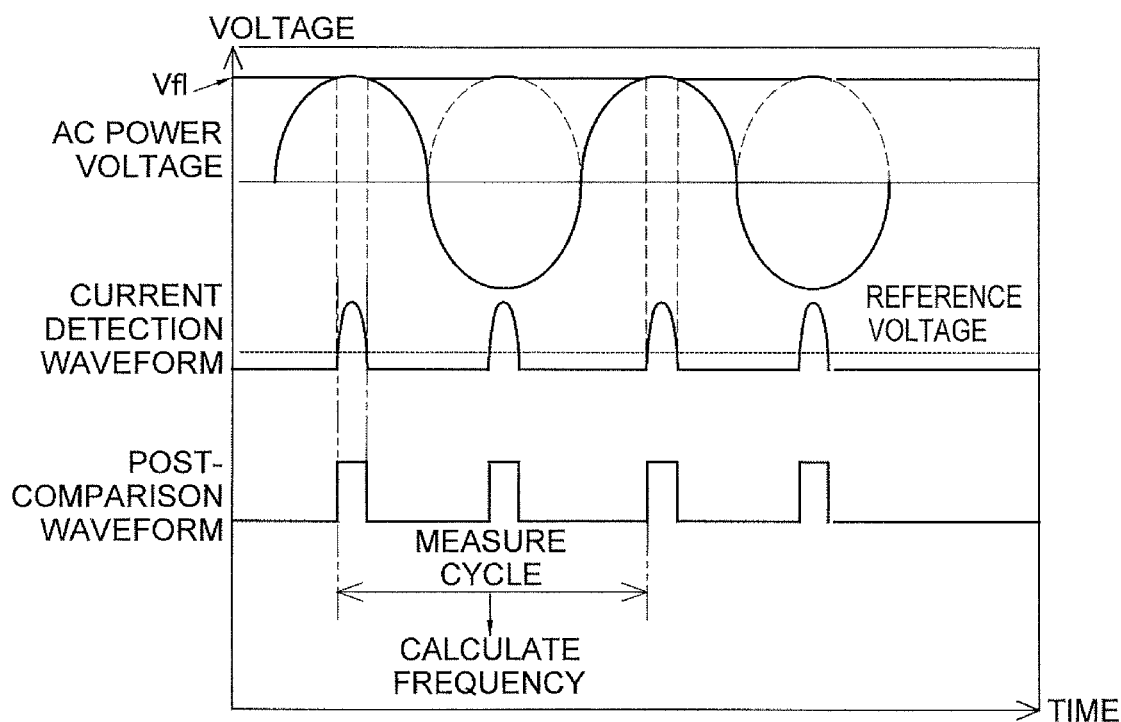
FIG. 5 is a graph showing a current detection waveform.

FIG. 5 is a graph showing a current detection waveform and a cycle measurement waveform obtained from the current detection waveform. In FIG. 5, the horizontal axis represents time and the vertical axis represents voltages. The charging current flows to the smoothing capacitor 124a, only during a cycle in which the AC power voltage is greater than the smoothed voltage Vf1. The current detection waveform shown in the middle of FIG. 5 is a waveform of the detected value acquired from the current detection unit 133. The comparison unit 121a compares the detected value with the reference voltage and generates a signal only when the detected value is higher than the reference voltage. The resultant signal waveform is the cycle measurement waveform, a post-comparison waveform shown at the bottom of FIG. 5.

The calculation unit 121b measures the cycle from an interval of the post-comparison waveform and calculates a frequency from the obtained cycle. In this case, since the post-comparison waveform is a signal that repeats high and low at every power half-cycle, a power cycle can be measured by measuring the time between every other pair of waveforms. The method for calculating the power frequency or power voltage phase is the same as the one described in the first embodiment.

(3) Characteristics of Second Embodiment

Since the inverter device 100 can be provided with the current detection circuit 133 that also uses the rectifying unit D101 which is already provided in the power circuit 124 for the inverter main circuit, the number of parts and the mounting area on a control board equipped with the inverter device 100 can be reduced.

(4) Other

The second embodiment describes the power supply device 150 that supplies power to the inverter unit 135 of the inverter device 100; however, the application of the present invention is not limited to the inverter device. The present invention can be applied to other DC load devices as well.

Third Embodiment

A third embodiment describes a switching power circuit equipped with the power supply device according to the present invention. The switching power circuit is used as a power circuit for providing a drive signal (DC voltage) to a control terminal of a switching element of a power conversion device such as an inverter device.

(1) Switching Power Circuit 200

Figure 6:
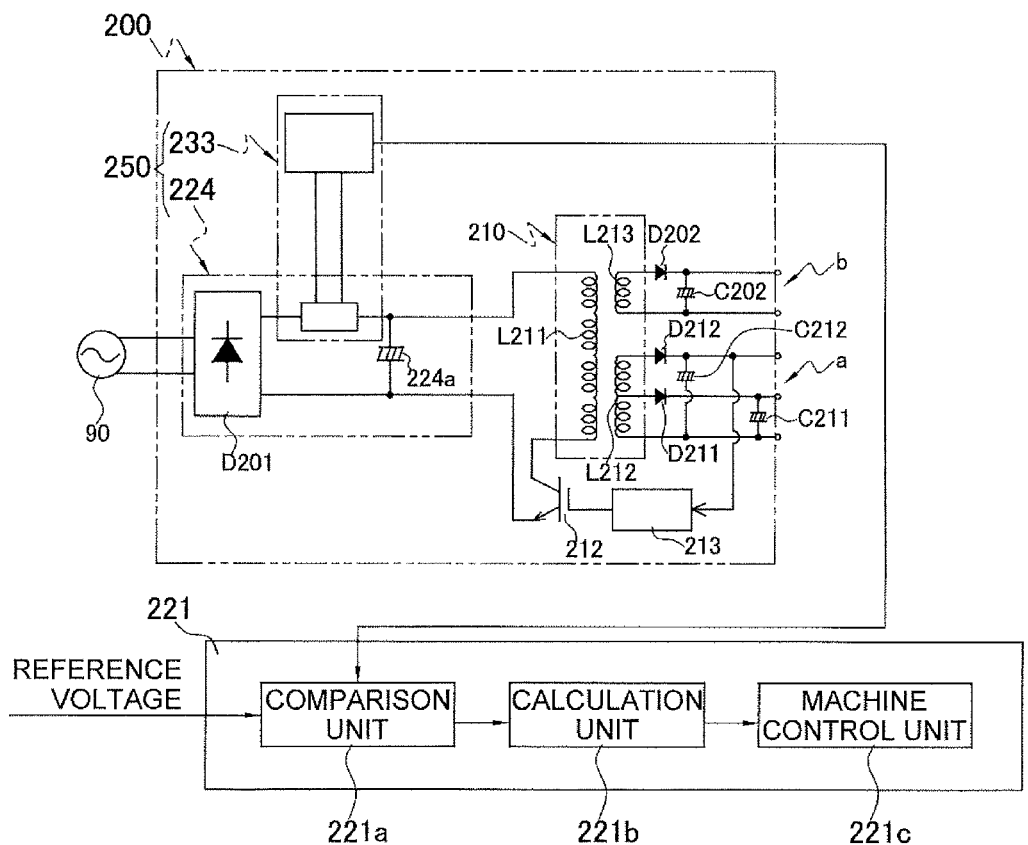
FIG. 6 is a circuit block diagram of a switching power circuit equipped with a power supply device according to a third embodiment of the present invention.

FIG. 6 is a circuit block diagram of a switching power circuit 200 equipped with a power supply device according to the third embodiment of the present invention. As shown in FIG. 6, the switching power circuit 200 is configured by connecting a power supply device 250, a switching transformer 210, a switching element 212 (e.g., IGBT), a controller 213, a primary-side smoothing capacitor 224a, secondary-side smoothing capacitors C211, C212, C202, and diodes D211, D212, D202.

(1-1) Power Supply Device 250

The power supply device 250 includes a primary-side power circuit 224 and a current detection unit 233.

(1-1-1) Primary-Side Power Circuit 224

The primary-side power circuit 224 is configured by the primary-side smoothing capacitor 224a, the current detection unit 233, and a part of a control unit 221.

(1-1-1-1) Primary-Side Smoothing Capacitor 224a

The primary-side smoothing capacitor 224a has one end connected to a positive-side output terminal of a rectifying unit D201 and the other end to a negative-side output terminal of the rectifying unit D201. The primary-side smoothing capacitor 224a smoothes a voltage rectified by the rectifying unit D201. The smoothed voltage is applied to an input-side winding 220 of the switching transformer 210 connected to the output side of the primary-side smoothing capacitor 224a.

In other words, the rectifying unit D201 and the primary-side smoothing capacitor 224a configure the primary-side power circuit 224 for the input-side winding L211 of the switching transformer 210.

(1-1-1-2) Current Detection Unit 233

The current detection unit 233, located between the rectifying unit D201 and the primary-side smoothing capacitor 224a, is connected to the positive-side output terminal of the primary-side smoothing capacitor 224a. The current detection unit 233 detects a charging current flowing into the primary-side smoothing capacitor 224a.

The current detection unit 233 may employ the same configuration as the power cycle detection circuit 33 described in the first embodiment; however, the configuration of the current detection unit 233 is not limited thereto. For example, the current detection unit 233 may be configured by an amplifier circuit that uses a shunt resistor and an operational amplifier for amplifying the voltage between both ends of the resistor, or a direct current-current transformer (DCCT). The charging current detected by the current detection unit 233 is input to a comparison unit 221a of the control unit 221.

(1-2) Control Unit 221

The control unit 221 has the comparison unit 221a, a calculation unit 221b, and a machine control unit 221c.

The comparison unit 221a compares a detected voltage output by the current detection unit 233 with a reference voltage and outputs a signal only when the detected voltage is higher than the reference voltage.

The calculation unit 221b calculates a frequency from the signal cycle output by the comparison unit 221a. This frequency is the power frequency.

The comparison unit 221a and the calculation unit 221b configure a part of the power supply device 250.

In a case where the machine to be controlled is the inverter device 100 of the second embodiment, the machine control unit 221c causes the compressor motor inverter unit 137 to generate a drive voltage for driving the compressor motor 75, on the basis of the power frequency and the power voltage phase that are output by the calculation unit 221b (see FIG. 4).

(2) Operations of Switching Power Circuit 200

The AC voltage supplied from the commercial power supply 90 is full-wave rectified by the rectifying unit D201 and then smoothed by the smoothing capacitor 224a. Due to the smoothed voltage, a current flows to the input-side winding L211 of the switching transformer 210 through the switching element 212. The switching element 212 is PWM-controlled by the controller 213 and performs high-frequency switching.

This switching induces, at a plurality of windings L212, L213 on the output side, a voltage based on the turn ratio thereof. The induced voltage is rectified and smoothed by the diodes D211, D212, D202 and the smoothing capacitors C211, C212, C202 and then supplied to output circuits a, b.

(3) Characteristics of Third Embodiment

Since the switching power circuit 200 can be provided with the current detection unit 233 that also uses the rectifying unit D201 which is already provided in the primary-side power circuit 224, the number of parts and the mounting area on a control board equipped with the switching power circuit 200 can be reduced.

INDUSTRIAL APPLICABILITY

The power supply device of the present invention is useful for an inverter device or a converter device, and the inverter device or the converter device is useful for a refrigeration device or an air cleaner.

REFERENCE SIGNS LIST

1 Air conditioner (Refrigeration device)
10 Indoor machine (utilization-side unit)
20 Outdoor machine (heat source-side unit)
21b Calculation unit
24 Transmission power supply unit (power generation unit)
24a Charging unit
33 Power cycle detection unit (detection unit)
50 Power supply device
100 Inverter device
121b Calculation unit
124 Power circuit for fan motor inverter main circuit (power generation unit)
124a Smoothing capacitor (charging unit)
133 Current detection unit (detection unit)
150 Power supply device
200 Switching power circuit
221b Calculation unit
224 Primary-side power circuit (power generation unit)
224a Primary-side smoothing capacitor (charging unit)
233 Current detection unit (detection unit)
250 Power supply device

CITATION LIST

Patent Literature

Patent Literature 1: Japanese Patent Application Laid-open No. 2005-257238
Patent Literature 2: Japanese Patent Application Laid-open No. 2005-20837
Patent Literature 3: Japanese Patent Application Laid-open No. 2001-238452

Patent Literature 4: Japanese Patent Application Laid-open No. 2002-223599

Patent Literature 5: Japanese Patent Application Laid-open No. 2006-34070

The invention claimed is:

1. A power supply device, comprising:
   a diode rectifier circuit comprising a rectifier diode and having an input connected to an AC power source, an output of the diode rectifier circuit producing a rectified voltage by the rectifier diode;
   a capacitor connected in series to the diode rectifier circuit to be charged by the rectified voltage, the capacitor constituting a power circuit;
   a controller configured to receive as input a detection signal representing a charging current flowing into the capacitor, the controller being further configured to calculate a voltage frequency, a cycle, or a power voltage phase of the AC power on the basis of the detection signal; and
   a detection circuit configured to also use the rectifier diode as an element leading a current for generating the detection signal input to the controller, the detection circuit having a photocoupler connected between the rectifier diode and the capacitor and used to detect the charging current flowing into the capacitor and produce the detection signal,
   wherein the diode rectifier circuit and the capacitor are connected as components of a circuit that supplies power to a transmission circuit transmitting a signal through a transmission line, thereby driving the detection circuit used to provide the detection signal with a voltage lower than the rectified voltage.

2. The power supply device according to claim 1, wherein the rectifier diode is connected in series with a current limiting resistor to limit the charging current flowing into the capacitor.

3. An inverter device comprising the power supply device according to claim 2, wherein the controller controls an amplitude or a frequency of an AC output voltage on the basis of the voltage frequency, the cycle, or the power voltage phase.

4. A converter device comprising the power supply device according to claim 2, wherein the controller controls a DC output voltage or an AC current on the basis of the voltage frequency, the cycle, or the power voltage phase.

5. An inverter device comprising the power supply device according to claim 1, wherein the controller controls an amplitude or a frequency of an AC output voltage on the basis of the voltage frequency, the cycle, or the power voltage phase.

6. A refrigeration device, comprising the inverter device according to claim 5.

7. The refrigeration device according to claim 6, further comprising:
   a utilization-side unit; and
   a heat source-side unit that is connected to the utilization-side unit by electrical wiring including the transmission line for transmitting the signal, wherein
   AC power is supplied to the utilization-side unit and the heat source-side unit.

8. An air cleaner, comprising the inverter device according to claim 5.

9. A converter device comprising the power supply device according to claim 1, wherein the controller controls a DC output voltage or an AC current on the basis of the voltage frequency, the cycle, or the power voltage phase.

10. A refrigeration device, comprising the converter device according to claim 9.

11. The refrigeration device according to claim 10, further comprising:
    a utilization-side unit; and
    a heat source-side unit that is connected to the utilization-side unit by electrical wiring including the transmission line for transmitting the signal, wherein
    AC power is supplied to the utilization-side unit and the heat source-side unit.

12. An air cleaner, comprising the converter device according to claim 9.

* * * * *